(12) United States Patent
Garcia-Martinez et al.

(10) Patent No.: US 10,163,136 B2
(45) Date of Patent: Dec. 25, 2018

(54) TARGETING STORIES BASED ON INFLUENCER SCORES

(71) Applicant: Facebook, Inc., Menlo Park, CA (US)

(72) Inventors: Antonio Felipe Garcia-Martinez, Alameda, CA (US); Rong Yan, Marina Del Rey, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/402,155

(22) Filed: Jan. 9, 2017

(65) Prior Publication Data

US 2017/0116650 A1 Apr. 27, 2017

Related U.S. Application Data

(63) Continuation of application No. 14/981,361, filed on Dec. 28, 2015, now Pat. No. 9,576,016, which is a continuation of application No. 13/429,126, filed on Mar. 23, 2012, now Pat. No. 9,262,791.

(51) Int. Cl.
| | |
|---|---|
| *G06Q 30/02* | (2012.01) |
| *G06Q 50/00* | (2012.01) |
| *G06F 17/30* | (2006.01) |
| *H04L 29/08* | (2006.01) |

(52) U.S. Cl.
CPC ... *G06Q 30/0277* (2013.01); *G06F 17/30345* (2013.01); *G06F 17/30598* (2013.01); *G06Q 30/0242* (2013.01); *G06Q 30/0269* (2013.01); *G06Q 50/01* (2013.01); *H04L 67/22* (2013.01); *H04L 67/306* (2013.01)

(58) Field of Classification Search
CPC ..... G06Q 50/01; G06F 17/3053; H04L 51/32; H04L 67/22
See application file for complete search history.

(56) References Cited

U.S. PATENT DOCUMENTS

| | | | |
|---|---|---|---|
| 7,827,208 B2 | 11/2010 | Bosworth et al. | |
| 8,825,759 B1 * | 9/2014 | Jackson | H04L 67/02 705/14.69 |
| 2006/0042483 A1 | 3/2006 | Work et al. | |
| 2008/0040370 A1 | 2/2008 | Bosworth et al. | |

(Continued)

FOREIGN PATENT DOCUMENTS

WO    WO 2010/099632 A1    9/2010

OTHER PUBLICATIONS

Canadian Intellectual Property Office, Office Action, Canadian Patent Application No. 2,865,749, dated Nov. 13, 2015, two pages.
(Continued)

*Primary Examiner* — Shean Tokuta
*Assistant Examiner* — Juan C Turriate Gastulo
(74) *Attorney, Agent, or Firm* — Fenwick & West LLP (57) ABSTRACT

A story describing an activity performed by an interacting user is distributed to viewing users according to the influencer scores for the viewing users. Each influencer score can be calculated based at least in part on the influence of a viewing user on those users connected to the viewing user, and on the influencer scores for the users connected to the viewing user. Based on the determined influencer scores, at least one of the viewing users can be provided with the story describing the activity performed by the interacting user.

16 Claims, 3 Drawing Sheets

(56) References Cited

U.S. PATENT DOCUMENTS

| | | |
|---|---|---|
| 2009/0112701 A1 | 4/2009 | Turpin et al. |
| 2010/0145777 A1 | 6/2010 | Ghosh et al. |
| 2010/0228631 A1 | 9/2010 | Zhang et al. |
| 2010/0268574 A1* | 10/2010 | Butcher ................. G06Q 10/10 705/14.53 |
| 2011/0225110 A1 | 9/2011 | Burns et al. |
| 2011/0225170 A1 | 9/2011 | Obasanjo et al. |
| 2012/0209832 A1 | 8/2012 | Neystadt et al. |
| 2012/0246302 A1 | 9/2012 | Lafleur et al. |
| 2013/0173333 A1* | 7/2013 | Zhang .................... G06Q 50/01 705/7.29 |

OTHER PUBLICATIONS

PCT International Search Report and Written Opinion, PCT Application No. PCT/US2013/031931, dated Jun. 26, 2013, eleven pages.

United States Office Action, U.S. Appl. No. 14/981,361, dated Apr. 5, 2016, 15 pages.

United States Office Action, U.S. Appl. No. 13/429,126, dated Mar. 12, 2015, 21 pages.

Australian Government, IP Australia, Examination report No. 1 for standard patent application, Australian Patent Application No. 2013235455, dated Jul. 18, 2017, three pages.

* cited by examiner

TARGETING STORIES BASED ON INFLUENCER SCORES

CROSS-REFERENCE TO RELATED APPLICATION

This application is a continuation of U.S. application Ser. No. 14/981,361, filed Dec. 28, 2015, which is a continuation application of U.S. patent application Ser. No. 13/429,126, filed Mar. 23, 2012, now U.S. Pat. No. 9,262,791, which are incorporated by reference herein in their entirety.

BACKGROUND

This invention generally pertains to social networking, and more specifically to computing influencer scores for users of a social networking system and targeting stories describing a user activity based on influencer scores.

Social networks, or social utilities that track and enable connections between users (including people, businesses, and other entities), have become prevalent in recent years. In particular, social networking systems allow users to communicate information more efficiently. For example, a user may post contact information, background information, job information, hobbies, and/or other user-specific data to a location associated with the user on a social networking system. Other users can then review the posted data by browsing user profiles or searching for profiles including specific data. The social networking systems also allow users to associate themselves with other users, thus creating a web of connections among the users of the social networking system. These connections among the users can be exploited by the social networking system to offer more relevant information to each user in view of the users' own stated interests.

Social networking systems typically incorporate a system for connecting users to content that is most likely to be relevant to each user. For example, users may be grouped according to one or more common attributes in their profiles, such as geographic location, employer, job type, age, music preferences, interests, or other attributes. Users of the social networking system or external parties can then use these groups to customize or target information delivery so that information that might be of particular interest to a group can be communicated to that group.

Advertisers have attempted to leverage this information about members by targeting their ads to members whose interests best align with the ads. For example, a social networking system may display banner ads for a concert to members who include an affinity for the performing band in their social networking system profile and live near a concert venue where that band might be performing. However, these attempts are no different than targeting of ads that exist in many other contexts. Advertisers have not yet been able to exploit the relationships and connections among members of a social networking system in a meaningful way to increase user engagement with an advertisement, advertised product, or brand.

SUMMARY

Embodiments of the invention are related to the determination of influencer scores for a plurality of users of a social networking system. In one embodiment, an influencer score is based at least in part on the influence of a first user on one or more users connected to the first user, and influencer scores for the one or more users. For example, an influencer score for a user John can be based on the influence of John on another user Bob, and on the influencer score for the user Bob. The influencer score for Bob may, in turn, be based on the influence of Bob on the users Joanne and Roger, and the influencer scores for Joanne and Roger. In one embodiment, the influence of the first user on a user connected to the first user can be based on the number and types of interactions performed by the connected user on content of the first user. For example, a first user may share a link to a web page over the social networking system. A user connected to the first user may thereafter comment on the sharing of the link. The connected user's comment may be used to determine the influence of the first user on the connected user.

In one embodiment, a story describing an activity performed by an interacting user is distributed to one or more viewing users according to a set of influencer scores for the viewing users. In the embodiment, each influencer score can be associated with a category assigned to the activity performed by the interacting user. For example, an interacting user may share a link to an article posted on an investment website. Because the link is associated with an article from the investment website, the interacting user's activity may be assigned to a finance category. An influencer score for a viewing user may thus be based on the viewing user's influence on each of his or her connections for the finance category, and on each connection's influencer score for the same finance category. Based on the influencer score for the viewing user and also, in some instances, on the influence of the interacting user on the viewing user, a story describing the activity performed by the interacting user can be provided to the viewing user.

By sending a story to a viewing user based in part on influencer scores, embodiments can improve the overall effectiveness of the story. More specifically, because a viewing user is presented with a story based on the viewing user's influence with respect to other users for a certain category, a subsequent interaction by the viewing user with the story (e.g., sharing the story) may enable the effective targeting of the story to other users who would also likely be interested in and interact with the story.

The features and advantages described in this summary and the following detailed description are not all-inclusive. Many additional features and advantages will be apparent to one of ordinary skill in the art in view of the drawings, specification, and claims hereof.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend," "follower," and "fan" refers to any other user to whom a user has formed a connection, association, or relationship via the system. Connections may be added explicitly by a user, for example, the user may select a particular other user to be a friend, or may be automatically created by the social networking site based on common characteristics of the users (e.g., users who are alumni of the same educational institution). Connections in social networking systems are usually in both directions, but need not be, so the terms "user" and "friend" depend on the frame of reference. For example, if Bob and Joe are both users and connected to each other in the system, Bob and Joe are also each other's friends. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system. As used herein, the term connection may also be used to generally refer to a friend, follower, or fan of a user.

In addition to interactions with other users, the social networking system provides users with the ability to interact with or perform activities relating to various types of social networking objects supported by the system. A social networking object can represent a variety of things, including, without limitation, profiles, applications (e.g., games playable within the social networking system), events (e.g., a page representative of a concert that users may attend), groups (e.g., a page to which user may belong), entity based pages or hubs (e.g., a page constituting a particular entity's presence on the social networking system), locations associated with a user (e.g., "Palo Alto, Calif., USA"), advertisements (e.g., a page including advertising content), user-generated content items (e.g., user posts), representations of physical or digital items, concepts, etc. A user can interact with a social networking object by associating with the object or interacting with the object. For example, a user can interact with an object by joining a group, attending an event, checking-in to a location, becoming a fan of an organization's fan page, liking a fan page, posting to a fan page, etc. These are just a few examples of the objects upon which a user may act on in a social networking system, and many others are possible. A user interaction can also include an item of user generated content. For example, a user can interact with a company's fan page by posting on the page. The post can include a user generated comment providing the user's opinion of the company's products.

In one embodiment, influencer scores are determined for one or more viewing users, and a story describing an activity performed by an interacting user is provided to the viewing users based on the influencer scores. As used herein, an influencer score for a viewing user can refer to a value representative of the viewing user's influence on his or her connections, and the connections' own influencer scores. For example, an influencer score can account for how influential a viewing user is with one of his friends, and also the friend's influencer scores with respect to her own friends.

By providing a story to a viewing user based on an influencer score for the viewing user, embodiments can improve the overall effectiveness of the story. More specifically, because a viewing user is presented with a story based on the viewing user's influence with respect to other users, a subsequent interaction by the viewing user with the story (e.g., sharing the story) may enable the effective targeting of the story to other users who would also likely be interested in and interact with the story.

In one embodiment, the set of influencer scores for the viewing users may be associated with a particular category assigned to the activity performed by the interacting user. For example, an interacting user may share a link to a comment posted on a baseball themed website. Because the link is associated with the aforementioned website, the interacting user's activity may be assigned to a sports category. Each determined influencer score for the viewing users may also be associated with the sports category. As a result, the influencer scores can more accurately reflect the influence that the interacting user's performance of the activity is likely to have on other users.

In one embodiment, each influencer score for a viewing user can be a function of the influence values for the viewing user with respect to his or her connections, and the influencer scores for the connections. In such an embodiment, an influencer score for the viewing user may be calculated using the following equation:

$$F(v) = \Sigma_{c=i} G(v,c) F(c)$$

In the equation shown above, F(v) is representative of the influencer score for a given viewing user (v). G(v,c) is representative of the influence value for the viewing user (v) with respect to a connection (c), where the viewing user (v) is associated with i connections. F(c) is representative of the influencer score for the connection (c).

The influence value G(v,c), in general, indicates the amount of influence the viewing user has on a connection. In one embodiment, the influence value can be calculated based on the number and types of interactions performed by the connection on the content of the viewing user (e.g., content generated by the viewing user, stories describing activities performed by the viewing user, etc.). In one aspect, the influence value may have a relatively high value if the number of interactions performed by the connection on the content of the viewing user is also relatively high. In another aspect, the influence value may be determined according to weights for the types of interactions performed by the connection, where different types of interactions are weighted differently. For example, an influence value may be higher if a connection comments on an activity performed by the viewing user rather than liking the activity. In one embodiment, the influence value may also be calculated based on the type of relationship between the viewing user and the connection. For example, an influence value may be higher if the connection is a friend of the viewing user rather than a fan of the viewing user. In one aspect, the content of the viewing user that is considered in calculating the influence value may be limited to those associated with the same category as the activity performed by the interacting user.

The influencer score F(c) for a connection of the viewing user can be based in part on an influence value G(c,k) for the connection with respect to a user connected to the connection, and an influencer score F(k) for the user connected to the connection. The influence value for the connection can be determined in a manner similar to the determination of the influence value G(v,c) for the viewing user.

In one embodiment, the influencer score for the viewing user can be calculated as the summation of a set of influencer score components for the viewing user, where each influencer score component is based on an influence value G(v,c) weighted against a corresponding influencer score F(c) In one embodiment, at least one viewing user may be provided with a story describing the activity performed by the interacting user, where the story is provided based on an influencer score component for the interacting user with respect to the at least one viewing user. The influencer score component for the interacting user can be based on the computed influencer score F(v) for the viewing user and an influence value for the interacting user with respect to the viewing user. The influence value for the interacting user can generally represent the amount of influence the interacting user has on the at least one viewing user.

In one embodiment, the at least one viewing user may be provided with a story if the influencer score component for the interacting user with respect to the viewing user exceeds a predefined threshold value. In another embodiment, the at least one viewing user may be provided with the story if the influencer score component corresponding to the viewing user is greater than other influencer score components corresponding to the viewing user. For example, a first interacting friend of a viewing user may have liked an article posted on a sports web page. A second interacting friend of the viewing user may have shared an article posted on a cooking blog. A story describing the activity of the first interacting friend may thereafter be provided to the viewing user because the influencer score component associated with the activity of the first friend is greater than the influencer score component associated with the activity of the second friend.

Figure 1:
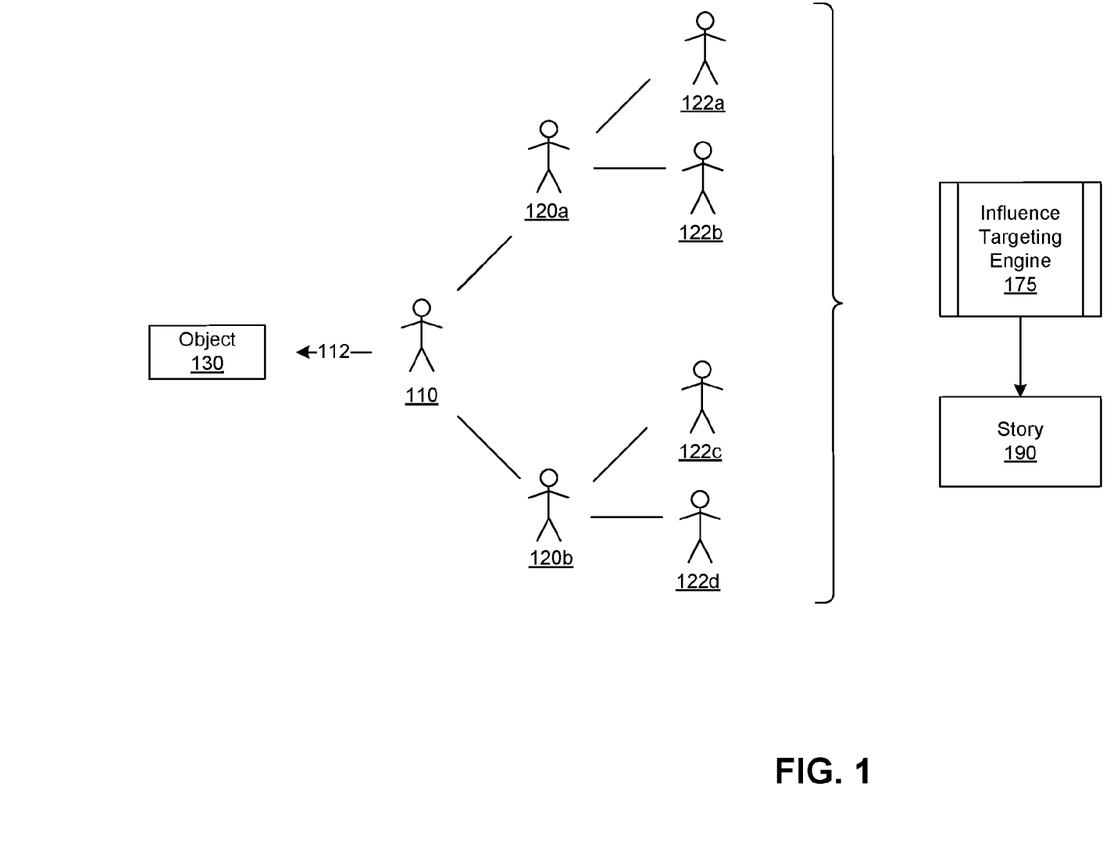
FIG. 1 is a diagram of a process for providing a story based on an influencer score, in accordance with an embodiment of the invention.

FIG. 1 illustrates a process for providing a story 190 to one or more viewing users 120 based on influencer scores. The process begins with an influence targeting engine 175 identifying an activity 112 performed by the interacting user 110 on an object 130. The object 130 may be, for example, an article posted on a particular web page. The interacting user 110 may have performed an activity on the object by sharing a link to the article. Upon identifying the activity 112 performed by the interacting user 110, the influence targeting engine 175 identifies one or more viewing users connected to the interacting user 110. In FIG. 1, the influence targeting engine 175 identifies the viewing users 120*a* and 120*b*. Upon identifying the one or more viewing users, the influence targeting engine 175 determines influencer scores for the viewing users 120, and the influence of the interacting user 110 on the viewing users 120. The influencer scores may be associated with a category assigned to the activity 112. In one embodiment, an influencer score can be based on the influence of the viewing user 120 on those users connected to the viewing user, and the influencer scores for the users connected to the viewing user. In FIG. 1, for example, an influencer score for the viewing user 120*a* can be based on the influence of the viewing user 120*a* on the users 122*a* and 122*b*, and on the influencer scores for the users 122*a* and 122*b*. Based on the calculated influencer scores for the viewing users 120 and the influence of the interacting user 110, one or more of the viewing users 120 are selected and provided with the story 190 describing the activity performed by the interacting user 110.

In one embodiment, the selection of the one or more of the viewing users 120 may be based on a threshold influencer score. In particular, a viewing user 120 may be selected only if the influencer score for the user exceeds a certain threshold influencer score. In this way, the influencer threshold score may act as a hard filter in the distribution of stories. The threshold influencer score may be automatically set by the social networking system or received from an advertiser or system operator.

In another embodiment, the selection of the one or more viewing users 120 may be based on the influencer score for the viewing users and/or other criteria. For example, in selecting the one or more viewing users, the influencer scores for the viewing users may be considered along with the ages, genders, interests, click through rates (CTR), and/or other criteria associated with the viewing users. In contrast to filtering viewing users based on a threshold influencer score, the embodiment considers the threshold scores as one of several inputs in the selection process. For example, the influencer score may be one of several features used to compute a score for ranking candidate stories or advertisements. In the embodiment, the higher the influencer score for a viewing user, the more likely the viewing user is selected to be provided with the story 190. However, a story need not meet a particular threshold influencer score to be selected for a viewing user.

In one embodiment, the viewing users 120 that are provided with the story 190 can interact with the story such that the story 190 can be presented to one or more users 122 connected to the viewing users. In such an embodiment, influencer scores are determined for the users connected to the viewing users 120. Thereafter, the influence targeting engine 175 can determine which users 122 to present with the story 190.

System Architecture

Figure 2A:
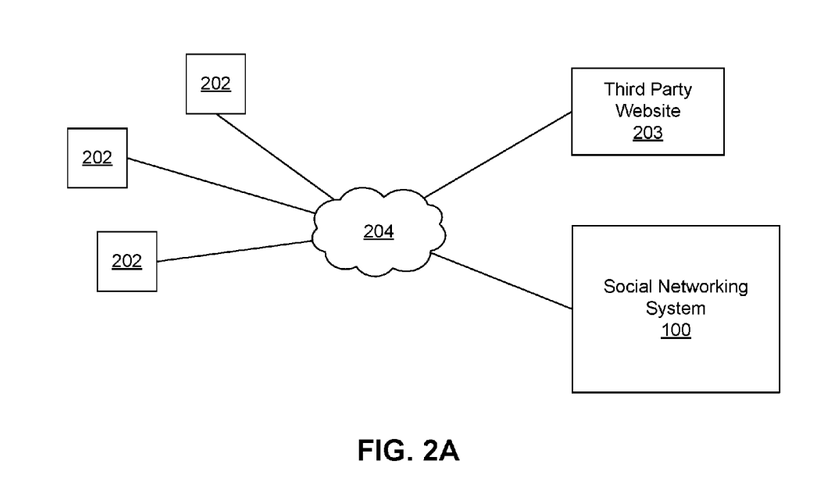
FIG. 2A is a high level block diagram illustrating a system environment suitable for operation of a social networking system, in accordance with an embodiment of the invention.

FIG. 2A is a high level block diagram illustrating a system environment suitable for operation of a social networking system 100. The system environment includes one or more client devices 202, one or more third-party websites 203, a social networking system 100, and a network 204. While only three client devices and one third-party website are shown in FIG. 2A, it should be appreciated that any number of these entities (including millions) can be included. In alternative configurations, different entities can also be included in the system.

The network 204, in general, can be any network, including but not limited to any combination of the Internet, a mobile network, a LAN, a wired or wireless network, a private network, and/or a virtual private network.

The client devices 202 include one or more computing devices that can receive user input and can transmit and receive data via the network 204. For example, the client devices 202 may be desktop computers, laptop computers, tablet computers (pads), smart phones, personal digital assistants (PDAs), or any other device including computing functionality and data communication capabilities. The client devices 202 are configured to communicate via network 204, which may include any combination of local area and/or wide area networks, using both wired and wireless communication systems. The client devices 202 can provide a means by which various users can communicate with the social networking system 100. The third party website 203 is coupled to the network 204 in order to communicate with the social networking system 100.

The social networking system 100 includes a computing system that allows users to communicate or otherwise interact with each other and access content as described herein. In one embodiment, the social networking system 100 stores user profiles that describe the users of a social network, including biographic, demographic, and other types of descriptive information, such as work experience, educational history, hobbies or preferences, location, and the like. The social networking system 100 additionally stores other objects, such as fan pages, events, groups, advertisements, general postings, etc.

Figure 2B:
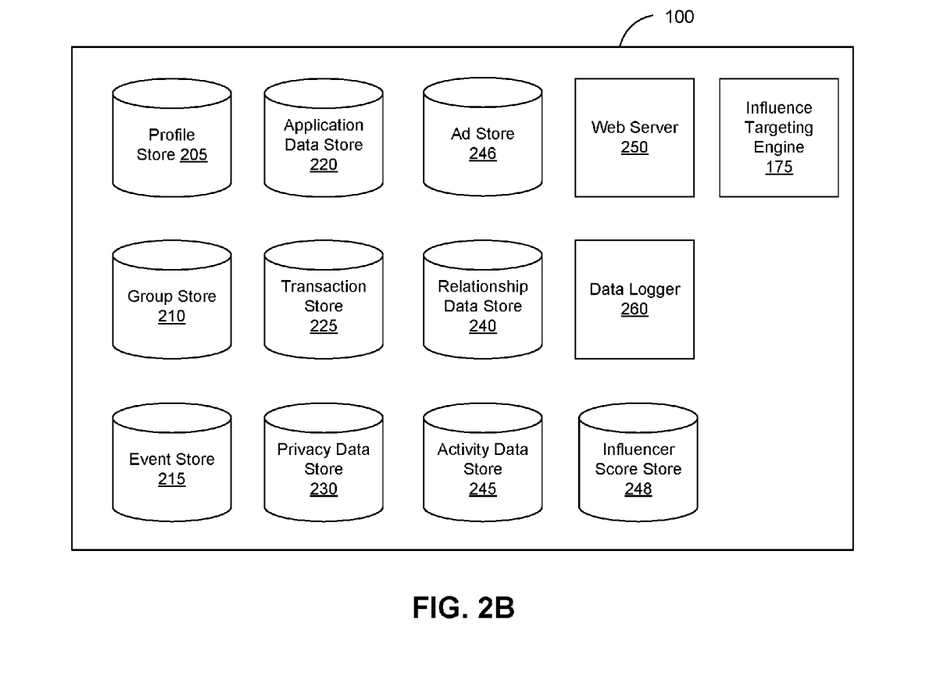
FIG. 2B is a block diagram of various components of a social networking system, in accordance with an embodiment of the invention.

FIG. 2B is an example block diagram of various components of the social networking system 100. The social networking system 100 includes a web server 250, a data logger 260, a influence targeting engine 175, a profile store 205, a group store 210, an event store 215, an application data store 220, a transaction store 225, a privacy data store 230, relationship data store 240, an activity data store 245, an ad store 246, and an influencer score store 248. In alternative configurations, different components can be included in the system 100.

In general, the web server 250 links the social networking system 100 via the network 204 to one or more of the client devices 202, as well as to one or more third party websites 203. The web server 250 may include a mail server or other messaging functionality for receiving and routing messages between the social networking system 100 and the client devices 202 or third party websites 203. The messages can be instant messages, queued messages (e.g., email), text and SMS messages, or any other suitable messaging technique. In one embodiment, the web server 250 can receive user requests for content, where a story (e.g., a newsfeed story, a sponsored story, etc.) is to be provided with the content. In response, the web server 250 may send a request for a story to the influence targeting engine 175.

The data logger 260 is capable of receiving communications from the web server 250 regarding the different interactions users may have with a number of different types of social networking objects in the social networking system 100. The social networking system 100 can maintain such data in any suitable manner. In one embodiment, each of the profile store 205, the group store 210, the event store 215, the application data store 220, the transaction store 225, the privacy data store 230, the relationship data store 240, the activity data store 245, the ad store 246, and the influencer score store 248 store data structures to manage the data for each instance of a corresponding type of social networking object maintained by the system 100. The data structures include information fields that are suitable for the corresponding type of object. (For example, the event store 215 contains data structures that include the time and location for an event, whereas the profile store 205 contains data structures with fields suitable for describing a user's profile.). When a new object of a particular type is created, the system 100 initializes a new data structure of the corresponding type, assigns a unique object identifier to it, and begins to add data to the object as needed. This might occur, for example, when a new user activity is detected by the system 100. In response, the system 100 would generate a new instance of an activity object in the activity data store 245, assign a unique identifier to the activity object, and populate the activity object with information describing the activity or interaction, etc.

The influence targeting engine 175 computes influencer scores for one or more viewing users, and determines which of the viewing users are to be sent a story 190 based on the influencer scores. In one embodiment, the influence targeting engine 175 can identify an activity performed by the interacting user 110. For example, the influence targeting engine 175 can retrieve information collected by the data logger 260 to determine that the interacting user 110 has liked a particular movie, liked a fan page, shared a particular link, shared a particular article, shared a photo album, etc.

Upon identifying the activity, the influence targeting engine 175 determines a category for the activity performed by the interacting user 110. A category can be based on the content of the object involved in the activity (e.g., topic of an article), metadata for the object involved in the activity, identification information for the object (e.g., a universal resource identifier used to access article can be accessed), or any combination thereof. For example, an interacting user 110 may indicate that he or she likes a particular article discussing the sport of football. The influence targeting engine 175 can thereafter process the text of the article to determine the subject of the article (i.e., football) using a natural language processing algorithm. As a result of such a determination, the influence targeting engine 175 assigns the interacting user's activity to a sports or football category.

As another example, an interacting user 110 may indicate that he or she likes the website of a particular electronics retailer. Based on the tags or other metadata embedded in the website, the influence targeting engine 175 assigns the interacting user's activity to an electronics category. In the example, the influence targeting engine 175 may reference a suitable data structure (e.g., a table) containing a correspondence between metadata and categories to determine the category for the activity.

As yet another example, an interacting user may share an article from a particular finance website. Because the article is taken from the finance website, regardless of its content, the influence targeting engine 175 may assign the interacting user's activity to a finance category. In the example, the influence targeting engine 175 may reference a suitable data structure (e.g., a table) containing a correspondence between universal resource identifiers (e.g., URLs, etc.) and categories to determine the category for the activity.

After identifying the category for the activity performed by the interacting user 110, the influence targeting engine 175 identifies one or more viewing users 120. Each viewing user can be a user connected to the interacting user 110 over the social networking system 100. For example, a viewing user can be a friend, follower, fan, etc. of the interacting user 110. After identifying the one or more viewing users 120, an influencer score component for the interacting user 110 with respect to each of the viewing users can be calculated. As will be described below, the calculated influencer score components can be used to determine which of the viewing users 120 to send the story 190. In one embodiment, an influencer score component can be computed as a function of an influence value for the interacting user 110 with respect to a given viewing user 120, and the influencer score for the viewing user.

In one embodiment, the influence targeting engine 175 may recursively calculate the influencer scores for the viewing users 120. In such an embodiment, the influence targeting engine 175 may calculate the influencer scores for the connections 122 of the viewing users, the influencer scores for a set of users connected to the connections 122, and so on. In other embodiments, the influencer scores for the viewing users 120 may have been previously calculated. In particular, the influence targeting engine 175 may periodically calculate and store, in the influencer score store 248, influencer scores for various categories for the users of the social networking system 100. In such an embodiment, the influence targeting engine 175 can retrieve the influencer scores for the viewing users 120 from the store 248, where each influencer score is associated with the category associated with the activity performed by the interacting user 110.

In one embodiment, the influencer score for each given viewing user 120 can be calculated based on a set of influencer score components for the viewing user 120. Each influencer score component for the given viewing user 120 can be computed as a function of the influence value for the viewing user with respect to one of his or her connections 122 weighted against the influencer score for the connection 122.

In one embodiment, each influence value for the viewing user 120 with respect to one of his or her connections 122 can be based on the number and types of interactions performed by the connection 122 on the content of the viewing user 120. In particular, the influence targeting engine 175 can identify one or more items of content associated with the viewing user 120. Each content item can be content generated by the viewing user, a story describing an activity performed by the viewing user, etc. For example, a content item may be a comment posted by the viewing user 120 to a fan page of a particular company. As another example, a content item may be a story indicating that the viewing user 120 has liked a particular movie. In one embodiment, the influence targeting engine 175 may identify the one or more items of content by referencing the various stores of the social networking system 100.

Upon identifying the one or more items of content, the influence targeting engine 175 determines a category for each item. The influence targeting engine 175 can determine the category for an item in any suitable manner. For example, the influence targeting engine 175 can determine the category for an item based on the information included in the item of content (e.g., the text, audio, and/or video of the item), metadata associated with the item of content (e.g., tags), and/or identification information (e.g., URLs) associated with the item of content.

After determining the categories for the items of content, the influence targeting engine 175 determines a set of candidate content items. In one embodiment, for each content item, the influence targeting engine 175 determines whether the category assigned to the content item matches the category assigned to the activity performed by the interacting user 110. If a match is determined, the item of content is included in the set of candidate content items. In other embodiments, determination of the influencer score for the viewing user may not be in association with a particular user activity. For example, influencer scores for the viewing user may be periodically computed by the influence targeting engine 175 for various categories. In such embodiments, the influence targeting engine 175 determines whether the category assigned to the content item matches the category with which the influencer score to be computed is to be associated.

Upon identifying the set of candidate content items, the influence targeting engine 175 identifies a subset of the candidate content items, where each item in the subset is a content item with which a given connection 122 of the viewing user 120 has interacted. For example, the influence targeting engine 175 may include a content item in the subset if a connection 122 has liked, shared, reviewed, and/or commented on the content item.

Upon identifying the subset of candidate content items, the influence targeting engine 175 determines the number of interactions performed by the connection 122 on the content items in the subset. For example, the subset may include two content items. The connection 122 may have interacted with a first content item twice. The connection 122 may have additionally interacted with a second content item three times. As such, the number of interactions performed by the connection 122 would be five. In addition to determining the number of interactions performed by the connection 122, the influence targeting engine 175 determines a type for each interaction performed by the connection 122. Based on the determined type for each interaction, the influence targeting engine 175 assigns a specific weight to the interaction. In one embodiment, interactions that are more indicative of the influence of the viewing user 120 may be weighted higher. For example, an interaction where the connection 122 has commented on a particular content item may have a greater weight than an interaction where connection 122 has liked a particular content item. In one embodiment, the influence targeting engine 175 further determines a relationship type for the viewing user 120 and the connection 122. For example, the influence targeting engine 175 can determine that the relationship between the viewing user 120 and the connection 122 is of a friend type.

Based on the number of interactions performed by the connection 122, the weights for the interactions, and the relationship type for the viewing user and the connection, the influence targeting engine 175 calculates an influence value for the viewing user 120 with respect to the connection 122. The influence value can be calculated in any suitable manner. In one embodiment, the weights of each interaction can be summed and thereafter multiplied by a relationship constant (a constant representative of the type of relationship between the viewing user and the connection) in order to obtain the influence value. As an example, a first interaction may have a weight of 1 and a second interaction may have a weight of 2. The values may be summed and multiplied by a relationship constant of 1. As a result, the influence value for the viewing user may be calculated to be a value of 3. In such an embodiment, the higher the weights, the greater the number of interactions, and the higher the relationship constant, the higher the influence value calculated by the influence targeting engine 175. Other calculations for determining an influence value may also be used.

After determining the influence value for each of the connections 122, the influence targeting engine 175 determines a set of influencer scores for the connections 122. In one embodiment, the influence targeting engine 175 may recursively calculate the influencer scores for the connections 122. In other embodiments, the influencer scores for the connections may have been previously calculated. In particular, the influence targeting engine 175 may periodically calculate and store, in the influencer score store 248, influencer scores for various categories for the users of the social networking system 100. In such an embodiment, the influence targeting engine 175 can retrieve the influencer score for the given connections 122 from the store 248.

Upon obtaining the influence values and influencer scores corresponding to the connections 122, an influencer score for the viewing user 120 can be calculated. In one embodiment, a set of influencer score components for the viewing user can be first computed. Each influencer score can be a function of the influence value corresponding to a particular connection 122 weighted against the influencer score for the same connection 122. In one embodiment, the influencer score component may be calculated by multiplying the influence value corresponding to a connection 122 with the influencer score for the connection 122. After calculating the set of influencer score components, the influence targeting engine 175 sums the components in order to determine the influencer score for the viewing user 120. In one embodiment, the influencer score for the viewing user 120 can be stored in, for example, the influencer score store 248.

As discussed, the influencer score components for the interacting user 110 can additionally be based on the influence values for the interacting user 110 with respect to the identified viewing users. Determination of each influence value for the interacting user 110 with respect to a given viewing user can be performed in a manner similar to the determination of an influence value for a viewing user with respect to a connection, as described above.

Based on the influencer scores for the viewing users 120 and the influence values for the interacting user 110, the influence targeting engine 175 calculates an influencer score component for the interacting user 110 with respect to each viewing user 120. Upon calculating each of the influencer score components for the interacting user 110, the score components can be summed to determine an influencer score for the interacting user 110. The influencer score components and/or the influencer score for the interacting user 110 can thereafter be stored, for example, in the influencer score store 248. In one embodiment, the influencer score components and/or influencer score can be stored in a suitable data structure, such as a database. The stored scores/components may be used to later distribute the story describing the activity performed by the interacting user 110. The stored scores/components can additionally be later referenced during, for example, the calculating of influencer score components for other users that are connected to (either directly or indirectly) to the interacting user 110.

In one embodiment, the influence targeting engine 175 determines one or more of the viewing users to provide the story 190 describing the user's activities. In one embodiment, such a determination is not made for each viewing user until a request for content including one or more stories is received from a viewing user. For example, the determination may not be performed for a given viewing user until the viewing user has requested a page that includes a newsfeed, sponsored stories, etc.

Determination of whether a viewing user is to be provided with the story 190 can be performed in any suitable manner. In one embodiment, the influence targeting engine 175 can compare an influencer score component for the interacting user 110 corresponding to the viewing user to a predefined threshold value. If the influencer score component exceeds the threshold, the story can be provided to the viewing user. The threshold value may have been previously received via an input provided by, for example, an operator of the social networking system 100. In another embodiment, the influence targeting engine 175 can compare the influencer score component corresponding to the viewing user with other influencer score components corresponding to the same viewing user, where the other influencer score components are associated with other activities performed by users connected to the viewing user. If the influencer score component associated with the activity of the interacting user 110 exceeds the other influencer score components, the story can be provided to the viewing user. For example, a first interacting user connected to a viewing user may like a particular movie. A second interacting user connected to the viewing user may share a particular article posted on a website. Two separate influencer score components with respect to the viewing user may be calculated. The influencer score components may be compared, and the activity associated with the higher influencer score component may be selected to have a story describing the activity provided to the viewing user. In still another embodiment, the influence targeting engine 175 may consider the influencer score component along with other criteria associated with the viewing user in determining whether the user is to be provided with a story.

After determining the viewing users to be provided with the story, the influence targeting engine 175 generates the story describing the activity performed by the interacting user 110. For example, the generated story may indicate that the interacting user has liked the fan page of a certain company. In one embodiment, the story can optionally include an input element. The input element enables a viewing user to interact with the story. For example, a viewing user 120 can use an input element to share a story with users connected to the viewing user. The input element can include any suitable mechanism for enabling an input to be received from a viewing user. For example, the input element can include a text field, a set of radio buttons, a set of checkboxes, a dropdown menu, a button or set of buttons, etc.

After generating the story, the influence targeting engine 175 sends, for display, the story to the viewing users 120 determined to be sent the story. In particular, a client 202 of the viewing users 120 can be configured to display the story to the viewing users. The generated story can be displayed to each selected viewing user 120 as a newsfeed story, a banner, an interactive pop-up, a sponsored story, or in association with an application associated with the social networking system executing on the client 202.

In one embodiment, after providing the story to a viewing user 120, the social networking system 100 can receive information from the viewing user 120 via the optional input element of the story. In one embodiment, the viewing user's interaction with the input element and the received information can be used to distribute the story and/or information regarding the viewing user's interaction to the connections 122 of the viewing user. For example, the viewing user 120 may share a story that includes a link posted by the interacting user 110. In response to the sharing, the social networking system 100 may provide the story to the connections 122 of the viewing user 120. In one embodiment, the story can be provided, for display, to the connections 122 based on influencer scores for the connections.

Method for Providing Stories Based on Influencer Scores

Figure 3:
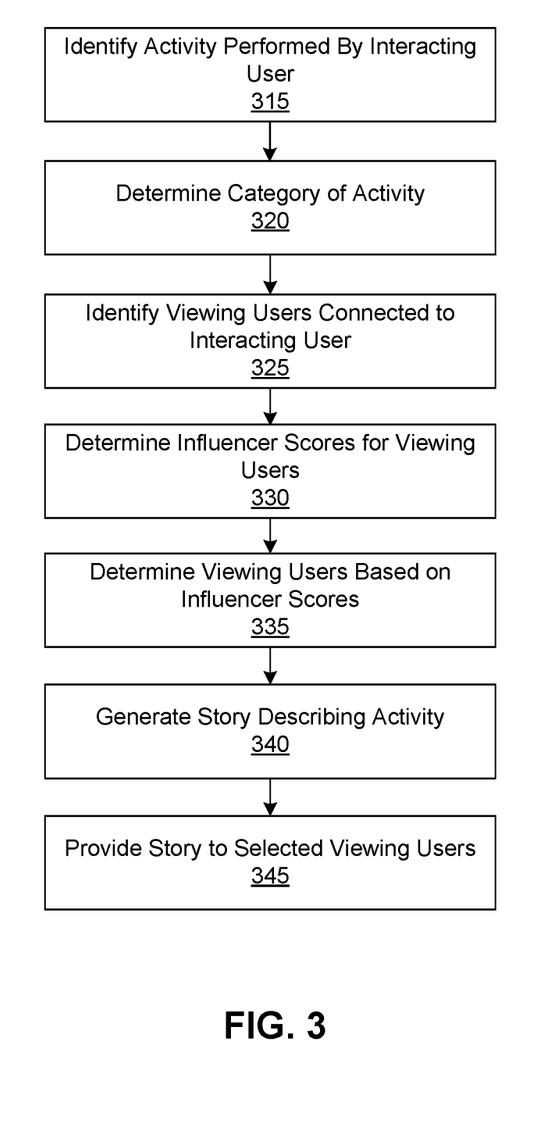
FIG. 3 is a flow chart of a process for providing a story to a viewing user based on an influencer score, in accordance with an embodiment of the invention.

FIG. 3 illustrates one embodiment of a process for providing a story based on an influencer score. In one embodiment, the process identifies 315 an activity performed by the interacting user 110. For example, the process can identify that the interacting user 110 has read a particular news article. The process determines 320 a category for the activity performed by the interacting user 110. For example, the interacting user 110 may share a link to an article posted on an investment blog. As such, the category for the activity may be considered to be finance. The process identifies 325 one or more viewing users connected to the interacting user 110. For example, each of the one or more viewing users may be a friend of the interacting user 110, a follower of the interacting user, a fan of the interacting user, etc. The process determines 330 influencer scores for the one or more viewing users 120. Each influencer score may be a function of the influence values for viewing user with respect to one or more connections of the viewing user, and the influencer scores for connections. After determining the influencer scores, the process determines 335, based on the calculated influencer scores, at least one viewing user to be provided with the story. In one embodiment, the process additionally determines the at least one viewing user based on an influence value for the interacting user with respect to the at least one viewing user. The process generates 340 the story describing the activity performed by the interacting user 110. The process provides 345 the story, for display, to the at least one viewing user.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may include a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   detecting, by a processor of an online system, an interaction with a content item by an interacting user of the online system;
   generating, by the processor, a first story indicating the interaction with the content item;
   identifying, by the processor, a first viewing user of the online system connected to the interacting user;
   determining, by the processor, for each connection in a first set of connections of the first viewing user, an influence value indicative of the first viewing user's influence on the connection, the influence value for a connection from the set of connections determined based on tracking interactions performed by the connection with content items associated with the first viewing user and assigning weights to each of the interactions according to interaction type;
   determining, by the processor, an influencer score for the first viewing user on the first set of connections based on the influence values determined for the first set of connections;
   determining, by the processor, based on the influencer score, to send the first story associated with the interacting user to the first viewing user;
   sending, by the processor, the first story to a client device for display to the first viewing user;
   detecting, by the processor, an interaction with the content item by the first viewing user;
   generating, by the processor, a second story indicating the interaction of the first viewing user with the content item;
   identifying, by the processor, a second viewing user of the online system connected to the first viewing user;
   determining, by the processor, for each connection in a second set of connections of the second viewing user, an influence value indicative of the second viewing user's influence on the connection;
   determining, by the processor, a second influencer score for the second viewing user on the second set of connections based on the influence values determined for the second set of connections;
   determining, by the processor, based on the second influencer score, to send the second story associated with the first viewing user to the second viewing user; and
   sending, by the processor, the second story to a second client device for display to the second viewing user.

2. The method of claim 1, further comprising:
   determining an influencer score for each connection in the first set of connections; and
   determining the influence score for the first viewing user based on the influencer scores for the first set of connections and the influence values for the first set of connections.

3. The method of claim 1, wherein the first story describes the interaction performed by the interacting user in the online system, the online system including a social networking system.

4. The computer-implemented method of claim 1, wherein determining the influencer score for first viewing user further comprises assigning a category to the interaction associated with the first story, wherein the influence values for the first set of connections of the first viewing user are each associated with the assigned category.

5. The computer-implemented method of claim 4, wherein assigning a category to the interaction is based at least on one of the following: the content item associated with a social networking object involved in the interaction, metadata associated with the interaction, and identification information for the interaction.

6. The computer-implemented method of claim 1, wherein the influence value for each connection from the first set of connections is based on a count of one or more interactions performed by the connection with content items associated with the first viewing user.

7. The computer-implemented method of claim 1, wherein assigning weights to each of the interactions according to interaction type includes assigning greater weight to an interaction having a comment type than an interaction having a like type.

8. The computer-implemented method of claim 1, wherein determining to send the first story comprises:
   comparing the influencer score for the first viewing user against a threshold value; and
   responsive to the influencer score for the first viewing user being greater than the threshold value, determining to send the first story to the first viewing user.

9. A computer program product comprising a non-transitory computer-readable storage medium containing computer program code that when executed by a processor, configures the processor for:
   detecting an interaction with a content item by an interacting user of an online system;
   generating a first story indicating the interaction with the content item;
   identifying a first viewing user of the online system connected to the interacting user;
   determining, for each connection in a first set of connections of the first viewing user, an influence value indicative of the first viewing user's influence on the connection, the influence value for a connection determined based on tracking interactions performed by the connection with content items associated with the first viewing user and assigning weights to each of the interactions according to interaction type;
   determining an influencer score for the first viewing user on the first set of connections based on the influence values determined for the first set of connections;
   determining, based on the influencer score, to send the first story associated with the interacting user to the first viewing user;
   sending the first story to a client device for display to the first viewing user;
   detecting an interaction with the content item by the first viewing user;
   generating a second story indicating the interaction of the first viewing user with the content item;
   identifying a second viewing user of the online system connected to the first viewing user;
   determining for each connection in a second set of connections of the second viewing user, an influence value indicative of the second viewing user's influence on the connection;
   determining a second influencer score for the second viewing user on the second set of connections based on the influence values determined for the second set of connections;
   determining based on the second influencer score, to send the second story associated with the first viewing user to the second viewing user; and
   sending the second story to a second client device for display to the second viewing user.

10. The computer program product of claim 9, where the computer program code that when executed by the processor further configures the processor for:
    determining an influencer score for each connection in the first set of connections; and
    determining the influence score for the first viewing user based on the influencer scores for the first set of connections and the influence values for the first set of connections.

11. The computer program product of claim 9, wherein the first story describes the interaction performed by the interacting user in the online system, the online system including a social networking system.

12. The computer program product of claim 9, wherein the influence value for each connection from the set of connections is based on a count of one or more interactions performed by the connection with content items associated with the first viewing user.

13. The computer program product of claim 9, wherein assigning weights to each of the interactions according to interaction types includes assigning greater weight to an interaction having a comment type than an interaction having a like type.

14. The computer program product of claim 9, wherein determining to send the first story comprises:
    comparing the influencer score for the first viewing user against a threshold value; and
    responsive to the influencer score for the first viewing user being greater than the threshold value, determining to send the first story to the first viewing user.

15. The computer program product of claim 9, wherein determining the influencer score for first viewing user further comprises assigning a category to the interaction associated with the first story, wherein the influence values for the first set of connections of the first viewing user are each associated with the assigned category.

16. The computer program product of claim 15, wherein assigning a category to the interaction is based at least on one of the following: the content item associated with a social networking object involved in the interaction, metadata associated with the interaction, and identification information for the interaction.

* * * * *